United States Patent [19]

Skeele

[11] Patent Number: 5,417,887
[45] Date of Patent: May 23, 1995

[54] REDUCED VISCOSITY, ORGANIC LIQUID SLURRIES OF ALUMINUM NITRIDE POWDER

[75] Inventor: Frank P. Skeele, Midland, Mich.

[73] Assignee: The Dow Chemical Company, Midland, Mich.

[21] Appl. No.: 63,588

[22] Filed: May 18, 1993

[51] Int. Cl.$^6$ .................... B01J 13/00; C01B 21/072
[52] U.S. Cl. .................. 252/309; 106/287.17; 252/314; 252/356; 501/98
[58] Field of Search ............ 252/309, 314, 315.2, 252/315.4, 356; 106/287.17; 501/98

[56] References Cited

U.S. PATENT DOCUMENTS

| | | | |
|---|---|---|---|
| 3,399,145 | 8/1968 | Martinek et al. | 252/309 |
| 4,110,230 | 8/1978 | Hessert et al. | 252/315.4 X |
| 4,238,387 | 12/1980 | Antonelli et al. | 252/315.6 X |
| 4,764,321 | 8/1988 | Huseby et al. | 501/98 X |
| 4,904,411 | 2/1990 | Novich et al. | 252/309 |
| 4,923,689 | 5/1990 | Uenishi et al. | 423/267 |
| 5,053,364 | 10/1991 | Ray | 501/98 X |
| 5,059,248 | 10/1991 | Signorino et al. | 252/356 X |
| 5,098,740 | 3/1992 | Tewari | 427/215 |
| 5,182,239 | 1/1993 | Hirokawa et al. | 501/98 |
| 5,273,699 | 12/1993 | Knudsen et al. | 501/98 X |

FOREIGN PATENT DOCUMENTS

| | | | |
|---|---|---|---|
| 62-264077 | 10/1987 | Japan | 21/72 |
| 63-151607 | 6/1988 | Japan | 21/72 |
| 63-225507 | 9/1988 | Japan | 21/72 |
| 64-61304 | 3/1989 | Japan | 21/72 |
| 1164710 | 6/1989 | Japan | 21/72 |
| 288412 | 3/1990 | Japan | 21/72 |
| 3261665 | 11/1991 | Japan | 35/58 |

OTHER PUBLICATIONS

Egashira et al., *Chemical Surface Treatments of Aluminum Nitride Powder Suppressing Its Reactivity with Water*, j. of Matls. Sci ltrs, 10(1991)994–996.

*Primary Examiner*—Richard D. Lovering
*Attorney, Agent, or Firm*—D. R. Howard

[57] ABSTRACT

Aluminum nitride powder slurry viscosity reductions occur with addition of an amount of a process aid such as a $C_1$–$C_{11}$ aliphatic carboxylic polyfunctional acid, an ammonium salt or alkali metal salt of such an acid, ethylenediaminetetraacetic acid, ammonium salts or alkali metal salts of ethylenediaminetetraacetic acid, and succinic anhydride.

9 Claims, No Drawings

REDUCED VISCOSITY, ORGANIC LIQUID SLURRIES OF ALUMINUM NITRIDE POWDER

BACKGROUND OF THE INVENTION

The present invention generally relates to aluminum nitride (AlN) powder slurries having a viscosity that favors processing of the slurries into ceramic greenware. The present invention also relates to the use of certain organic compounds to modify reactivity of aluminum nitride with organic components of the slurries and preclude thickening thereof to such an extent that they are not readily processable.

AlN exhibits certain physical properties that make it particularly suitable for use in a variety of applications. Some applications, such as those in packaging components for electronic circuitry, require substantially full theoretical density and high thermal conductivity. High quality AlN powder, when densified by sintering, hot-pressing or other suitable means, generally satisfies these requirements.

AlN powder is typically converted to ceramic greenware suitable for sintering by slip casting or tape casting a slurry of the powder in a suitable solvent. As an alternative, AlN powder can be recovered from the slurry by spray drying. After recovery, the AlN powder can be dry pressed, cold pressed, cold isostatic pressed or otherwise converted to greenware via conventional technology. Because AlN powder readily hydrolyzes or reacts with water, organic solvents are favored over water. In an effort to increase density of the greenware, organic lubricants are often added to a slurry of AlN powder and one or more sintering aids in an organic solvent. A principal reason for adding the lubricants is to enhance particle-particle sliding. Typical lubricants include stearic acid, oleic acid and aluminum stearate. Unfortunately, these lubricants tend to react with AlN surfaces and form reaction products that thicken the slurry to a consistency resembling that of pudding. Such a consistency is not readily processable in ceramic forming equipment.

One means of overcoming reactivity of AlN powder surfaces involves oversaturating said surfaces with the lubricant(s). Oversaturation may occur by doubling or even tripling what might otherwise be regarded as a "normal" amount of lubricant. Unfortunately, this also leads to other problems. One such problem is a phenomenon known as "springback" during forming. Springback, as used herein, means the elastic release of stored elastic energy to cause a dimensional increase upon release of a pressed ceramic body from a die. In other words, dimensions of the body after release from the die exceed those of the body prior to release from the die. This can, in turn, lead to delamination or separation of pressed material within the ceramic body. The delamination or material separation induces cracks within the ceramic body. A second problem is a high residual carbon content after organic compounds are "burned out" or removed by heating prior to sintering. A high residual carbon content can adversely affect physical properties of a resultant sintered body. Such physical properties include thermal conductivity, density and electrical performance.

It would be desirable if there were a simple, yet effective means or method of modifying the surfaces of AlN powder in an organic liquid slurry to minimize thickening of the slurry. It would also be desirable if there were a material that could be added to a thickened organic liquid slurry based upon aluminum nitride to reduce its viscosity to a level that equates to ready processibility.

SUMMARY OF THE INVENTION

One aspect of the present invention is an improved AlN powder slurry containing an organic solvent, AlN powder, a sintering aid, a dispersant, an organic lubricant and a binder, the improvement comprising a viscosity reducing amount of a processing aid selected from the group consisting of aliphatic carboxylic polyfunctional acids containing from 2 to 11 carbon atoms, alkali metal salts of said carboxylic acids, ammonium salts of said carboxylic acids, ethylenediaminetetraacetic acid, alkali metal salts of ethylenediaminetetraacetic acid, ammonium salts of ethylenediaminetetraacetic acid, and succinic anhydride.

A second aspect of the present invention is a process for reducing viscosity of an organic liquid slurry containing a combination of an organic solvent, AlN powder, a sintering aid, a dispersant, an organic lubricant and a binder by adding a viscosity reducing amount of a processing aid selected from the group consisting of aliphatic carboxylic polyfunctional acids containing from 2 to 11 carbon atoms, alkali metal salts of said carboxylic acids, ammonium salts of said carboxylic acids, ethylenediaminetetraacetic acid, alkali metal salts of ethylenediaminetetraacetic acid, ammonium salts of ethylenediaminetetraacetic acid, and succinic anhydride.

A third aspect of the present invention is a process for reducing viscosity of a thickened organic liquid slurry containing an organic solvent, AlN powder, a sintering aid, a dispersant, an organic lubricant and a binder by adding a viscosity reducing amount of a processing aid selected from the group consisting of aliphatic carboxylic polyfunctional acids containing from 2 to 11 carbon atoms, alkali metal salts of said carboxylic acids, ammonium salts of said carboxylic acids, ethylenediaminetetraacetic acid, alkali metal salts of ethylenediaminetetraacetic acid, ammonium salts of ethylenediaminetetraacetic acid, and succinic anhydride.

DETAILED DESCRIPTION OF THE INVENTION

AlN powder suitable for purposes of the present invention need not be prepared by any particular method. It is preferably prepared by carbothermal reduction wherein aluminum oxide, carbon and nitrogen react at a high temperature. It may also be prepared by direct nitridation wherein aluminum metal powder is nitrided in a nitrogen or ammonia atmosphere at a high temperature. The resultant direct nitrided powder is usually pulverized to reduce the average particle size. Other known methods of synthesizing AlN powder may also be used if desired. The powder beneficially has an average particle size of from about 1 micrometer ($\mu$m) to about 20 $\mu$m.

Processing aids suitable for purposes of the present invention are used in an amount sufficient to either maintain or regain a slurry viscosity that is readily processible. The amount is preferably from greater than about 0.075 to about 2.0 weight percent (wt-%), based upon weight of the AlN. The amount is more preferably from about 0.1 to about 1 wt-%. An amount of less than about 0.075 wt-% will not reduce reactivity of AlN powder with organic slurry components enough to maintain or regain a processible viscosity. An amount in excess of 2.0 weight percent is unnecessary and may, in fact, result in enough excess carbon to adversely affect physical properties of a resultant sintered body.

As used herein, the term "processible viscosity" refers to a viscosity of less than 1000 centipoise (cps) (1.0 pascal-second (Pa.s), preferably from about 400 to about 800 cps (0.4 to 0.8 Pa.s).

Processing aids suitable for purposes of the present invention must meet three criteria. First, they must, when added as a component of an organic solvent-based AlN slurry, maintain a processible viscosity or reduce an excessively high viscosity to a processible viscosity. Second, they must volatilize, sublime or decompose at a temperature of less than about 500° C., preferably less than about 400° C. Third, any decomposition product that remains must not have a significant adverse effect upon physical properties of a sintered body prepared from the AlN powder. An adverse effect may be regarded as significant when the sintered body does not perform as desired for a given application. What may be regarded as significant in one application may be of no consequence in another. A skilled artisan can, given a particular use or application, determine what is "significant" without undue experimentation.

In addition to the foregoing mandatory criteria, there are two desirable criteria. One criterion is solubility in lower alcohols such as methanol, ethanol, isopropanol and isobutanol. A second desirable criterion is an absence of a level of irritation, hazard or reactivity that requires undue precautions or special equipment or both.

Processing aids are desirably selected from the group consisting of aliphatic carboxylic polyfunctional acids containing from two to eleven carbon atoms, esters of said carboxylic acids, salts of said carboxylic acids, anhydrides of said carboxylic acids and aromatic carboxylic acid anhydrides. As used herein, the term "polyfunctional acid" means an acid having two or more, preferably two, three or four, carboxyl groups. The aliphatic carboxylic acids may be straight-chained acids, branched-chain acids or substituted acids. They may also be saturated or unsaturated. The acids may be represented by a formula:

$R(COOH)_y$ where y is 1, 2 or 3 and R is —COOH or has from 1 to 10 carbon atoms, provided that when y is 2, R contains no more than 9 carbon atoms and when y is 3, R contains no more than 8 carbon atoms. Carboxylic acids include: dicarboxylic acids such as oxalic acid, malonic acid, succinic acid, glutaric acid, adipic acid, maleic acid and fumaric acid; and tricarboxylic acids such as citric acid (2-hydroxy, 1,2,3-propanetricarboxylic acid). Suitable anhydrides include succinic anhydride. The carboxylic acid salts may be alkali metal salts or ammonium salts. Ammonium salts are preferred over alkali metal salts because they decompose to generate ammonia which volatilizes during processing whereas the alkali metal salts decompose to generate alkali metal ions that remain with the AlN powder. Desirable ammonium salts include ammonium citrate and the ammonium salt of ethylenediaminetetraacetic acid (EDTA). The processing aid is preferably citric acid, succinic anhydride, ammonium citrate, EDTA or the ammonium salt of EDTA, more preferably citric acid or ammonium citrate and most preferably citric acid.

An AlN powder slurry based upon an organic solvent or dispersing medium typically contains at least one sintering aid, at least one dispersant, at least one organic lubricant and at least one binder. The sintering aid(s), dispersant(s) and binder(s) may be any of those conventionally used with AlN. Suitable sintering aids include alkaline earth metal oxides and halides, rare earth metal oxides and halides, and oxides and halides of yttrium. An amount of sintering aid within a range of from about 2 to about 4 wt-%, based upon weight of AlN powder, yields satisfactory results. Polyvinylpyrrolidone is a suitable dispersant. An amount of dispersant within a range of from about 0.25 to about 1.0 weight percent, based upon combined weight of AlN powder and sintering aid(s), is typical. Binders include an admixture of ethylene oxide/propylene oxide block polymer and polyvinylpyrrolidone, an admixture of polyethyloxazoline and polyethylene glycol or an admixture of a polyvinyl butyral resin and butyl benzyl phthalate. An amount of binder within a range of from about 3 to about 8 wt-%, based upon combined weight of AlN powder and sintering aid(s), is suitable.

The organic solvent is preferably a lower ($C_1$–$C_4$) alcohol. Lower alcohols include methanol, ethanol, isopropanol and isobutanol. Ethanol provides particularly satisfactory results. The solvent is desirably present in an amount within a range of from about 35 to about 50 wt-%, based upon total slurry weight. In functional terms, the amount is large enough to promote uniform mixing of all slurry components, but small enough to allow drying within a reasonable time.

Preferred organic lubricants include stearic acid, oleic acid and aluminum stearate. The preferred lubricants promote reduction of ejection forces needed to remove greenware prepared using a dried slurry from a forming die. In the absence of such a lubricant, removal from the forming die is more difficult and may lead to damage or deformation of the greenware. By using the preferred lubricants, the greenware has a higher green density than can be attained with other, less effective lubricants such as butyl stearate and polyethylene glycol. An amount of lubricant within a range of from about 0.5 to about 1.5 wt-%, based upon combined weight of AlN powder and sintering aid(s), provides satisfactory results. In the absence of an effective amount of a processing aid in accordance with the present invention, the preferred lubricants react with the aluminum nitride and cause the slurry viscosity to increase to over 1500 cps (1.5 Pa.s). In practical terms, such a viscosity represents a thickened, "pudding-like" consistency that sticks to sides of a mixing container and must be scraped, rather than poured from the container.

The processing aid need not be added to the organic slurry in any particular order with respect to other components of the slurry. Surprisingly, it can even be added last. In other words, it can be added to a thickened slurry. As it is stirred into the thickened slurry, viscosity lessens and the slurry becomes thinner. The viscosity reduction depends, to a large extent, upon the amount of processing aid. Greater reductions take place with increasing amounts of processing aid. In addition, some processing aids are more effective than others with a particular lubricant.

The processing aid is preferably added to the slurry before the lubricant to avoid undue thickening and maintain a processible viscosity. An effective order of addition that precludes undue thickening, begins by adding the AlN powder and sintering aid(s), either sequentially or simultaneously, to the organic solvent with stirring. As stirring continues, the dispersant, processing aid, lubricant and binder are added in that order.

After all components are added to, and uniformly dispersed throughout, the slurry, mixing stops. The slurry is then poured out of, or otherwise removed from, its mixing container. The solvent may then be removed from the slurry by conventional techniques such as spray drying or oven drying. The resultant dry powder is suitable for conversion to ceramic greenware by conventional procedures such as cold pressing or cold isostatic pressing.

The following examples simply illustrate the present invention and are not to be construed, by implication or otherwise, as limiting its scope. All parts and percentages are by weight and all temperatures are in ° Celsius (° C.) unless otherwise stated.

Example 1

Ammonium Citrate as a Process Aid

Ethanol (amount shown in Table I) is added to a vessel having a capacity of 0.25 liters. Next, 0.31 g of polyvinylpyrrolidone as a surfactant and 3.13 g of a binder combination are added to the ethanol. The binder combination is an a mixture of an ethylene oxide/propylene oxide block polymer and polyvinylpyrrolidone commercially available from Nalco Chemical under the trade designation NALCO 93QC015 LIQUID BINDER. Ammonium citrate as a processing aid (amount shown in Table I), AlN powder (50 g) having an average particle size of <1 μm and an oxygen content of 1.3%, 2.08 g of yttria, and 0.39 g of either oleic acid or stearic acid (type shown in Table I) are sequentially added in the order given with milling to prepare a slurry.

The slurry, following addition of all components, is evaluated for viscosity. This evaluation is qualitative in that its goal is to determine whether a slurry has a viscosity of less than 1000 cps (1.0 Pa.s). Results of viscosity testing are shown in Table I wherein the amounts of ammonium citrate and ethanol are based upon total weight of solids in the slurry.

TABLE I

| Sample No. | Lubricant | Ammonium Citrate Amount (wt-%) | Ethanol (wt-%) | Viscosity (Pa · s) |
|---|---|---|---|---|
| A | oleic acid | 0.2 | 65.8 | <1.0 |
| B | oleic acid | 0.4 | 65.8 | <<1.0 |
| C | stearic acid | 0.5 | 65.8 | <<1.0 |
| D* | oleic acid | 0.0 | 65.8 | >>1.0 |

*-Not an example of the Invention

The data presented in Table I show that 0.2 wt-% of ammonium titrate provides a considerable reduction in viscosity. Lesser amounts are also expected to yield a viscosity of <1.0Paos. Increasing the amount to 0.4 wt-%, in conjunction with oleic acid, or 0.5 wt-%, in conjunction with stearic acid, substantially reduces viscosity. Similar results are expected with amounts as high as 2.0 wt-%. When satisfactory results are obtained with amounts of 0.2 wt-% and below, such larger amounts are unnecessary.

Example 2

Citric Acid as a Process Aid

The procedure of Example 1 is replicated save for changing the process aid to citric acid, reducing the amounts of process aid and using only stearic acid as a lubricant. Amounts of citric acid and ethanol and results of viscosity testing are shown in Table II.

The data presented in Table II, particularly when compared to that of Table I show that citric acid

TABLE II

| Sample No. | Citric Acid Amount (Wt-%) | Ethanol (Wt-%) | Viscosity (Pa · s) |
|---|---|---|---|
| A* | 0.05 | 65.8 | >1.0 |
| B* | 0.075 | 65.8 | >1.0 |
| C | 0.085 | 65.8 | ≦1.0 |
| D | 0.1 | 65.8 | <1.0 |
| E | 0.2 | 65.8 | <<1.0 |
| F* | 0.0 | 65.8 | >>1.0 |

*-Not an example of the Invention is far more effective than ammonium citrate in reducing slurry viscosity. An amount less than 0.075 wt-% but greater than 0.05 wt-% should produce similar results. As with ammonium citrate, larger amounts of citric acid, while certainly feasible, are not needed.

Example 3

EDTA as a Process Aid

The procedure of Example 1 is replicated save for changing the process aid to EDTA and using stearic acid as the lubricant. Amounts of EDTA and ethanol and results of viscosity testing are shown in Table III. The data presented in Table III demonstrate that EDTA is an effective process aid. It must, however, be used in larger amounts than either ammonium citrate or citric acid to accomplish an equivalent reduction in viscosity. Similar results are obtained with the hydrated ammonium salt of EDTA.

TABLE III

| Sample No. | EDTA Amount (Wt-%) | Ethanol (Wt-%) | Viscosity (Pa · s) |
|---|---|---|---|
| A* | 0.3 | 65.8 | >>1.0 |
| B* | 0.6 | 65.8 | >1.0 |
| C | 0.9 | 65.8 | ≦1.0 |
| D | 1.9 | 65.8 | <1.0 |
| E | 2.9 | 65.8 | <<1.0 |
| F* | 0.0 | 65.8 | >>1.0 |

*-Not an example of the Invention

Example 4

Succinic Anhydride as a Process Aid

The procedure of Example 1 is replicated save for changing the process aid to succinic anhydride and using stearic acid as the lubricant. Amounts of succinic anhydride and ethanol and results of viscosity testing are shown in Table IV.

TABLE IV

| Sample No. | EDTA Amount (Wt-%) | Ethanol (Wt-%) | Viscosity (Pa · s) |
|---|---|---|---|
| A* | 0.6 | 65.8 | >>1.0 |
| B | 0.6 | 65.8 | ≦1.0 |
| C | 0.9 | 65.8 | ≦1.0 |
| D* | 0.0 | 65.8 | >>1.0 |

*-Not an example of the Invention

The data presented in Table IV demonstrate that succinic anhydride is an effective process aid. It must, however, be used in larger amounts than any of ammonium citrate, citric acid, EDTA or the hydrated ammonium salt of EDTA to accomplish an equivalent reduction in viscosity. By way of contrast, acetic acid, ammonium acetate (with stearic acid), ammonium benzoate (with stearic acid), benzoic acid and phthalic anhydride provide no help in reducing slurry viscosity even at amounts as high as 2.0 wt-%.

The data presented in the Examples shows that citric acid, ammonium citrate, EDTA and succinic anhydride effectively reduce slurry viscosity. Similar results are expected with other processing aids disclosed herein. As shown in the Examples, effective amounts may vary depending upon the choice of processing aid and lubricant.

What is claimed is:

1. In an improved aluminum nitride powder slurry consisting essentially of a combination of an organic solvent, aluminum nitride powder, a sintering aid, a dispersant, an organic lubricant and a binder, the improvement comprising a viscosity reducing amount of a processing aid selected from the group consisting of aliphatic carboxylic polyfunctional acids containing from 2 to 11 carbon atoms, alkali metal salts of said carboxylic acids, ammonium salts of said carboxylic acids, ethylenediaminetetraacetic acid, alkali metal salts of ethylenediaminetetraacetic acid, ammonium salts of ethylenediaminetetraacetic acid, and succinic anhydride.

2. The slurry of claim 1 wherein the processing aid is selected from the group consisting of citric acid, succinic anhydride, ammonium citrate and ethylenediaminetetraacetic acid.

3. The powder of claim 1 wherein the processing aid is citric acid or ammonium citrate.

4. The slurry of claim 1 wherein the amount of processing aid is from greater than 0.075 to about 2.0 weight percent, based upon weight of the aluminum nitride.

5. The slurry of claim 1 wherein the amount of processing aid is from greater than about 0.1 to about 1 weight percent, based upon weight of the aluminum nitride.

6. A process for reducing viscosity of an organic liquid slurry consisting essentially of an organic solvent, aluminum nitride powder, a sintering aid, a dispersant, an organic lubricant and a binder by adding a viscosity reducing amount of a processing aid selected from the group consisting of aliphatic carboxylic polyfunctional acids containing from 2 to 11 carbon atoms, alkali metal salts of said carboxylic acids, ammonium salts of said carboxylic acids, ethylenediaminetetraacetic acid, alkali metal salts of ethylenediaminetetraacetic acid, ammonium salts of ethylenediaminetetraacetic acid, and succinic anhydride.

7. The process of claim 6 wherein the processing aid is selected from the group consisting of citric acid, succinic anhydride, ammonium citrate and ethylenediaminetetraacetic acid.

8. A process for reducing viscosity of a thickened organic liquid slurry consisting essentially of an organic solvent, aluminum nitride powder, a sintering aid, a dispersant, an organic lubricant and a binder by adding a viscosity reducing amount of a processing aid selected from the group consisting of aliphatic carboxylic polyfunctional acids containing from 2 to 11 carbon atoms, alkali metal salts of said carboxylic acids, ammonium salts of said carboxylic acids, ethylenediaminetetraacetic acid, alkali metal salts of ethylenediaminetetraacetic acid, ammonium salts of ethylenediaminetetraacetic acid, and succinic anhydride.

9. The process of claim 8 wherein the processing aid is selected from the group consisting of citric acid, succinic anhydride, ammonium citrate and ethylenediaminetetraacetic acid.

* * * * *